United States Patent Office 3,234,383
Patented Feb. 8, 1966

3,234,383
PROCESS AND CATALYST FOR THE POLYMERIZATION OF OLEFINS
Arthur Livingston Barney, Wilmington, Del., assignor to E. I. du Pont de Nemours and Company, Wilmington, Del., a corporation of Delaware
No Drawing. Filed May 28, 1964, Ser. No. 371,133
19 Claims. (Cl. 260—80.5)

This application is a continuation-in-part of my copending application Serial No. 253,996, filed January 25, 1963, now abandoned.

This invention relates to novel catalyst compositions and the production of polymers and copolymers in the presence of these catalysts. More particularly this invention relates to a novel vanadium coordination catalyst and its use as a catalyst for the polymerization or copolymerization of alpha-olefins.

High molecular weight hydrocarbon polymers and copolymers made by the polymerization or copolymerization of alpha-olefins in the presence of coordination catalysts are acquiring increasing technical and commerical importance today. In this development, coordination catalysts made from vanadium compounds and organo aluminum compounds have exhibited unusual promise. For commerical operation it would be particularly desirable to increase the productivity of these vanadium catalysts.

It is an object of this invention to provide novel vanadium coordination catalysts which display superior catalytic activity. A further object is to provide a process for the production of these novel catalysts. Another object is to provide a process for the polymerization or copolymerization of alpha-olefins in the presence of the novel vanadium coordination catalysts.

These and other objects are accomplished by a novel catalyst composition prepared by mixing in an inert solvent (1) about 3 to 30 molar portions of a dialkyl aluminum monohalide wherein said halide is selected from the group consisting of chlorine, bromine and iodine; (2) about a molar portion of a vanadium compound selected from the group consisting of trialkyl orthovanadates, triphenyl orthovanadates having hydrogen attached to the ortho-position, and open-chain beta-diketone chelates of trivalent vanadium, and (3) at least about a 0.01 molar portion of a metal promoter compound selected from the group consisting of open-chain beta-diketone chelates of zinc, open-chain beta-diketone chelates of cadmium, zinc salicylate and cadmium salicylate with the proviso that the vanadium concentration in said composition be at least 0.0001 molar.

The novel catalyst compositions of this invention are particularly useful for preparing polymers and copolymers of alpha-olefins. The process involves contacting and reacting at least one alpha-olefin and optionally at least one non-conjugated diene in the presence of the above-defined polymerization catalyst and recovering said polymerized product.

The heart of the present invention is the surprising and unexpected discovery that a catalyst composition displaying superior productivity for polymerizing alpha-olefins can be formed by mixing three specially selected organo metallic compounds. The activity of this novel catalyst depends to a remarkable degree upon the selected nature of its components. One of the components is a vanadium compound. It has been found that vanadium tris(acetylacetonate) can be employed but vanadium oxytrichloride is ineffective. Another component is an organo aluminum compound. It has been observed that diisobutyl aluminum chloride can be used but the closely related triisobutyl aluminum is ineffective. The third component is an open-chain beta-diketone chelate of zinc or an open-chain beta-diketone chelate of cadmium or a salicylate of either of these metals. Zinc bis(thenoyl trifluoroacetonate) gives outstanding results as a promoter compound for the other components in this catalyst composition; however, closely related chelates such as copper bis-(thenoyl trifluoroacetonate) and nickel bis(thenoyl trifluoroacetonate) are ineffective. The synergistic activity of these zinc and cadmium compounds is particularly surprising because catalysts made by mixing the selected vanadium compounds with these zinc or cadmium compounds in the absence of the dialkyl aluminum halides display no activity. Furthermore, the composition obtained by mixing the zinc compound with the aluminum alkyl is not a catalyst. The examples given hereinafter illustrate the enhanced productivity of the catalysts of the present invention. As a representative illustration of the effect: when 0.05 millimole of vanadium tris(thenoyl trifluoroacetonate) and 1.5 millimole of diisobutyl aluminum chloride were used at 0° C. to catalyze the formation of ethylene/propylene/1,4-hexadiene copolymer in hexane, 6.1 grams of product were obtained after 30 minutes; in contrast, when 0.05 millimole of zinc bis(thenoyl trifluoroacetonate) was mixed with the other two catalyst components, the resulting composition catalyzed the formation of 17.1 grams of copolymer under the same conditions.

The coordination catalyst is obtained by mixing the vanadium, aluminum, and zinc (or cadmium) compounds in an inert liquid organic medium.

The organo aluminum compounds are dialkyl aluminum monohalides having the structure

where $R_1$ and $R_2$ may be the same or different $C_1$–$C_{18}$ alkyl radicals and where X is chlorine, bromine, or iodine. Representative examples of these aluminum compounds include: diisobutyl aluminum chloride, which is preferred; diisopropyl aluminum monochloride; dimethyl aluminum bromide; diethyl aluminum chloride; dipropyl aluminum chloride; ethyl hexyl aluminum chloride; ethyl isobuytl aluminum chloride; isobutyl decyl aluminum chloride; isoamyl dodecyl aluminum iodide and ethyl propyl aluminum chloride.

The vanadium compounds are selected from the group consisting of trialkyl orthovanadates where the alkyl is $C_1$ to $C_{18}$, triphenyl orthovanadates and betadiketone chelates of trivalent vanadium. Representative examples of trialkyl orthovanadates include triethyl orthovanadate, tripropyl orthovanadate, tributyl orthovanadate, tri(tertiary-butyl) orthovanadate, triisoamyl orthovanadate, triisooctyl orthovanadate, tri-n-decyl orthovanadate, tri-2-hendecyl orthovanadate, tri-n-dodecyl orthovanadate, tri-n-octadecyl orthovanadate. The ortho esters of vanadium are described in Z. anorg. Chem., 82, page 103 (1913), and are conventionally prepared by reacting vanadium pentoxide with a large molar excess of the particular saturated, aliphatic monohydric alcohol at the reflux temperature. (See U.S. Patent 3,008,948.) Representative examples of ortho-unsubstituted triphenyl orthovanadates include: triphenyl orthovanadate; tris(para-chlorophenyl) orthovanadate; and tris(para-bromophenyl) orthovanadate. These compounds can be made by reacting the corresponding phenols with vanadium oxytrichloride in accordance with the general procedures set out in Z. anorg. u allgem. Chem., 296, 36 (1958).

In general the open-chain beta-diketone chelates of trivalent vanadium have no more than a total of 30 carbon atoms and have the formula

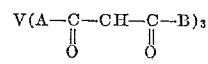

where A and B, which can be same or different in an individual molecule, are selected from the group of radicals consisting of alkyl; cycloalkyl; aryl; aralkyl; 2-thienyl; 2-furyl; and haloalkyl (esp. fluoroalkyl). Representative examples of these beta-diketone chelates are vanadium tris(thenoyl trifluoroacetonate); vanadium tris (trifluoroacetylacetonate); vanadium tris(hexofluoroacetylacetonate) and vanadium tris(acetylacetonate. Preparation of vanadium tris-acetylacetonate is described in J. Chem. Soc. 103, 78 (1913).

Representative examples of open-chain beta-diketone chelates of zinc and cadmium include: zinc bis(thenoyl trifluoroacetonate); zinc bis(hexafluoroacetylacetonate); zinc bis(acetylacetonate) which is preferred; the zinc chelate of dibenzoylmethane; and cadmium bis-(thenoyl trifluoroacetonate). Representative compounds have the formula

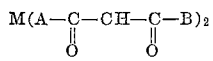

where M=Zn or Cd; A and B, which can be the same or different in an individual molecule, are selected from the group of radicals consisting of alkyl; cycloalkyl; aryl; aralkyl, 2-thienyl; 2-furyl; and haloalkyl. In general the beta-diketone chelates have no more than a total of 30 carbon atoms. Beta-diketones are described in Chemistry of the Metal Chelate Compounds by A. E. Martell and M. Calvin, Prentice-Hall, Inc., New York, 1952, pages 549–555; and British Patent 895,676.

The inert organic solvent employed is selected from the group consisting of hydrocarbon and halogenated hydrocarbon compounds and miscible mixtures thereof. Representative solvents include: aliphatic hydrocarbons such as pentane, hexane, isooctane, and decane; cycloaliphatic hydrocarbons such as cyclopentane and cyclohexane; aromatic hydrocarbons such as benzene, toluene, ethylbenzene, cumene, and mixed xylenes; halogenated aliphatic hydrocarbons such as tetrachloroethylene, carbon tetrachloride, methylene chloride, ethyl chloride, 1,2-dichloroethane, and trichloromonofluoromethane; and halogenated aromatic hydrocarbons such as chlorobenzene. The inert solvent should not adversely affect the formation and activity of the compound of the present invention It should also be free from well known catalyst poisons such as water, oxygen, carbon monoxide, and organic compounds containing groups bearing Zerewitinoff-active hydrogen atoms. The compounds employed as solvents are frequently liquid at room temperature (e.g. 20–30° C.); however, the only requirement is that the solvent system must be liquid at the chosen operating temperature.

In making the novel catalyst composition of this invention, the order of addition is not critical. Thus, one can mix all three components simultaneously, one can mix one component with a mixture of either of the other two, or one can add them sequentially in any order; the catalyst can also be prepared in the presence or absence of monomers.

A sufficient quantity of the organo aluminum compound is supplied so that the value of the molar ratio of aluminum to vanadium is at least 3:1. The preferred value for the ratio ranges between about 6:1 to 30:1. The particularly preferred value ranges from about 6:1 to 14:1. At the higher ratios, well above 30:1, the synergistic effect becomes insignificant, the catalyst acting essentially the same as if the zinc (or cadmium) promoter were absent. Those skilled in the art can determine by routine empirical experiments the optimum value to employ within the recommended range for a particular purpose.

As stated above, the novel catalyst is prepared in an inert liquid medium. The concentration of catalyst in this medium is not critical but when the catalyst is used it should provide a vanadium concentration of at least 0.0001 molar. In typical experiments the concentration has ranged between about 0.0001 and 0.0005 molar; usually there is no practical advantage in using concentrations above about 0.005 molar, because of the problems of heat dissipation. As the vanadium concentration is decreased below 0.0001 molar, the synergistic effect of the zinc or cadmium promoter tends to fall off; at extremely low vanadium concentrations, the synergistic effect is not observed. It is to be understood that stronger or more dilute catalyst solutions can be made which are diluted or concentrated, respectively, to attain values within the range recommended above. The concentration of the zinc or cadmium compound needed will depend somewhat upon the vanadium concentration; the molar ratio of vanadium compound to zinc or cadmium compound is about 100:1 or below, frequently ranging from about 10:1 to about 1:1. Larger proportions of the zinc or cadmium compound can be used but there is generally no need for the ratio to be less than 1:5.

The catalyst can be made in one solvent, for example, cyclohexane, and the resulting solution dispersed in another, for example, tetrachloroethylene, the original solvent being removed if desired. Alternatively, the vanadium compound can be made up in one solvent or mixtures of solvents, the organo aluminum compound can be prepared in a different solvent or a different mixture of solvents, the zinc or cadmium compound can be prepared in a still different solvent or a still different mixture of solvents, and these catalyst components solutions added to yet still another solvent or yet still another mixture of solvents in the reaction vessel.

Useful temperatures for polymerization or copolymerization using the novel catalyst compositions range from about −30° C. to at least above 70° C. It is generally inconvenient to operate at temperatures below about −30° C. because additional cooling equipment is required; furthermore, at temperatures much below −30° C. the reaction rate is undesirably reduced and it is more difficult to prepare copolymers of suitable composition. The activity of the catalyst of the present invention tends to decrease as the temperature is raised; however, outstanding productivity can be retained by increasing the monomer concentration (e.g. by raising the monomer gas pressure in reactors having a vapor space). The preferred temperature range is about −10 to +10° C.; however, temperatures at least as high as 50° C. are quite suitable. At temperatures above about 70° C., the catalyst will still display better productivity than will similar catalysts made without the zinc or cadmium components; however, the shorter catalyst life at 70° or above is not as convenient for some purposes as the longer life prevailing at lower temperatures.

In general, an inert medium is used during the polymerization catalyzed by the compound of the present invention. Any inert organic liquid of the types set out above as suitable for making the catalyst composition can be employed for the polymerization. If desired, the polymerization can be run in the catalyst solution itself. The above-enumerated catalyst poisons should be rigidly excluded from the polymerization medium. The reaction vessel and feed lines should be swept by an inert gas, such as purified nitrogen or argon, before introduction of monomer gases. Drying towers containing molecular sieves or a purification train wherein at least one tower contains silica gel and at least one tower contains an aluminum trialkyl compound are recommended for scrubbing monomer gases before they contact the catalyst of the present invention. Normally liquid monoolefins and non-conjugated dienes can be purified by fractional distillation and subsequent passage through silica gel or alumina.

Any material which is inert to the reactants is suitable for the reaction vessel. Glass, glass-enamel, or stainless steel are satisfactory. The reactor should be equipped with means for agitation. For runs at atmospheric pressure, the monomer gas inlet tube opening can be above or below the liquid surface of the reaction mixture. The gas outlet tube should have suitable traps to prevent the inflow of outside air.

As has been stated above, the catalyst of the present invention is generally used in a liquid monomer diluent or an inert liquid medium. When tetrachloroethylene is the representative inert liquid medium employed, the copolymers generally tend to form in solution. For convenient stirring, it is preferred that the concentration of polymer not exceed about 5%–10% by weight, although it is to be understood that higher concentrations can be employed. Lower concentrations increase the amount of solvent to be recovered; this is inconvenient and economically more costly. When methylene chloride is employed as the reaction medium, ethylene copolymers are obtained in slurry form if the total concentration of monomers is below 2 molar and the temperature is below the normal boiling point of methylene chloride.

The polymerization is started by contacting the α-olefin, or mixture of olefins with the novel coordination catalyst. This catalyst can be pre-mixed outside the reaction zone and subsequently introduced therein. The compositions formed by mixing the zinc (or cadmium) compound and the vanadium compound can be stored indefinitely at room temperature. The zinc (or cadmium) compound appears to react with the dialkyl aluminum monohalide, but the resulting compositions can be used in the present invention and can be stored indefinitely at room temperature. Thus prior to use one can add the zinc (or cadmium) compound to one or both of the other two components. When the aluminum and vanadium compounds are mixed in the absence of the zinc (or cadmium) compound, an active conventional catalyst results; it will undergo the usual catalyst decay with time, the higher the temperature, the shorter the lifetime. One can make the catalyst of the present invention by adding the zinc compound to the already-formed conventional catalyst. If the aluminum and vanadium compounds are mixed at a temperature low enough to retard catalyst decay significantly (e.g. 0° C.), one may add the zinc (or cadmium) compound as much as 30 minutes afterwards. Although the novel coordination catalyst of this invention can be pre-mixed, it is best to employ it very soon afterward.

Alternatively it can be formed, wholly or partially, in situ; the vanadium compound, or the organo aluminum compound and the chelate compound can be introduced simultaneously or in any order into the reaction zone.

In carrying out the polymerization process, the monomers are introduced, separately or in admixture, at a rate equal to or in excess of the rate at which polymer is formed. All of the monomers can be present before the run is started; alternatively, part or all of the monomers may be added during the polymerization. This introduction may be continuous or periodic.

The polymerization is stopped by deactivating the catalyst. An alcohol, such as isopropanol, is convenient for this purpose. Polymers in slurry form can be isolated by conventional filtration. Polymers in solution can be isolated by evaporating the solvent or by precipitation with a non-solvent. Frequently, the polymer is treated with an aqueous mineral acid, for example, 10% HCl to remove vanadium and aluminum salts, the solution or slurry thereafter being washed with distilled water until the washings are acid free. A non-volatile antioxidant, such as 2,2′-methylene bis(6-tert-butyl-4-methylphenol) or 4,4′-thiobis(2-tert-butyl-5-methylphenol) is often incorporated prior to the final isolation step to minimize possible oxidation and degradation of the polymer product.

The polymers can be prepared in the presence of the novel catalyst by a continuous process at atmospheric, subatmospheric, or superatmospheric pressure. Thus the inert medium, the catalyst (or its components), and the monomers may be introduced continuously into a polymerization zone at such a rate as to provide a residence time sufficient to build up the desired concentration of polymer in the polymerization mass. The residence time may vary widely from less than about 1 minute to several hours or more. In general, the residence time will be shorter as the concentrations of reactants and catalysts in the feed stream are increased and as the temperature is raised. The polymerization mass which continually flows from the polymerization zone is contacted in a subsequent zone with a catalyst deactivator; the polymer is ultimately continually obtained after suitable continuous purification and isolation procedures similar to those described above. If desired, the copolymer produced by the continuous reaction can be purified and isolated by batch procedures.

The new catalyst system can be employed for making homopolymers of alpha monoolefins of the formula R—CH=CH$_2$ wherein R is hydrogen or an alkyl radical of no more than 16 carbon atoms. Representative examples of these monoolefins include: ethylene; propylene; 1-butene; 1-pentene; 1-decene; 1-octadecene; and 4-methyl-1-pentene.

In addition, the new catalyst system can be used in making copolymer of two or more of the above-described alpha monoolefins. Ethylene copolymers are particularly suitable. Representative examples include: ethylene/propylene; ethylene/1-butene; ethylene/1-decene/4-methyl-1-pentene and propylene/1-butene. If an ethylene copolymer with elastomeric properties is desired, the copolymer should contain about 20 to 75 percent by weight of ethylene monomer units and it is preferred to use straight-chain monoolefins.

The outstanding benefit from the novel catalyst system is gained in copolymerizations of alpha monoolefins involving non-conjugated dienes, particularly the open-chain type such as 1,4-hexadiene wherein the double bonds are close together. In order to provide excellent sulfur curability, it is often desired to incorporate as much as several percent by weight of said diene in the copolymer. Unfortunately, many of these dienes, such as 1,4-hexadiene, are difficult to incorporate [see Industrial and Engineering Chemistry, Product Research and Development, vol. 1, No. 7, June 1962, pages 66–68]; the productivity obtained when terpolymers such as ethylene/propylene/1,4-hexadiene, or dipolymers such as ethylene/1,4-hexadiene are made in the presence of conventional catalysts leaves something to be desired. In contrast, the novel catalyst of this invention permits attainment of exceptionally improved productivity. For this particularly meritorious application one uses at least one alpha monoolefin, preferably ethylene, and at least one non-conjugated hydrocarbon diene. Representative non-conjugated dienes include (a) dicyclopentadiene; (b) an open-chain C$_5$–C$_{22}$ aliphatic diene having the formula

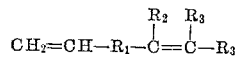

wherein R$_1$ is an alkylene radical, R$_2$, R$_3$ and R$_4$ are independently selected from a group consisting of hydrogen and alkyl radicals; (c) a 5-alkenyl-substituted-2-norbornene having the formula

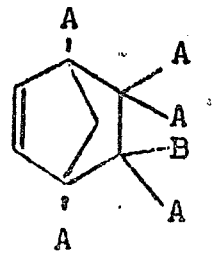

where each A is H or C$_1$–C$_6$ alkyl and B is a monovalent alkenyl radical having an internal (non-terminal) carbonto-carbon double bond; (d) a 5-alkylidene-2-norbornene having the following structure

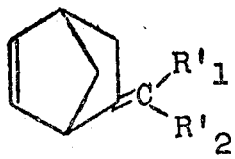

wherein $R'_1$ and $R'_2$ are H or alkyl radicals having a total between them of up to 16 carbon atoms, and (e) a 2-alkyl-2,5-norbornadiene having the following structure

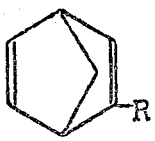

where R is a $C_1$–$C_8$ alkyl radical.

Representative copolymers containing diene monomer units include: ethylene/1,4-hexadiene; ethylene/propylene/1,4 - hexadiene; ethylene/propylene/dicyclopentadiene; ethylene/propylene/5 - methylene - 2 - norbornene; ethylene/propylene/5 - (2' - ethyl - 2' - butenyl) - 2-norbornene; and ethylene/1 - butene/2 - ethyl - 2,5-norbornadiene. Representative examples of copolymers containing non-conjugated hydrocarbon diene monomer units are described in the following patents: U.S. Patent 2,933,480 (open-chain aliphatic $C_5$–$C_{22}$ dienes); U.S. Patent 3,000,866 (dicyclopentadiene); U.S. Patent 3,063,-973 (2-alkyl-2,5-norbornadienes); French Patent 1,285,-090 (5-methylene-2-norbornene); and French Patent 1,-302,960 (5-alkenyl-2-norbornenes).

The following examples will better illustrate the nature of the present invention; however, the invention is not intended to be limited to these examples. Parts are by weight unless otherwise indicated.

*Example 1*

A. Polymerization reactor and the preparation of a monomer mixture therein: The reaction flask was a one-liter glass resin flask equipped with a mechanical stirrer, a thermometer, a gas inlet tube, a gas outlet tube, and a liquid inlet tube covered with a rubber serum cap. This apparatus was flame-dried and allowed to cool under a stream of purified nitrogen which was maintained during subsequent operations until monomer gases were introduced.

Five hundred milliliters of n-hexane, which had been stored over silica gel and sparged with purified nitrogen, were introduced into the reaction flask and thereafter sparged with purified nitrogen while rapidly stirred. After external cooling had been applied and the temperature had been adjusted to 0° C., the nitrogen feed was stopped and a feed stream supplying ethylene and propylene at the respective rates of 1.0 and 2.0 liters/min. was introduced into the reaction vessel below the agitated liquid surface. The ethylene and propylene had been purified separately by passing them through a molecular sieve column, type 5–A, 1/16-inch (commercially available from Fisher Scientific Co.), and then combined in a mixing T. Continued inflow of the monomer feed stream saturated the hexane with monomers; the excess monomers were allowed to escape through the gas outlet tube which was attached to suitable traps to prevent inflow of air to the apparatus. Five ml. of 1,4-hexadiene were then added through the serum cap from syringes.

B. The coordination catalyst was formed in situ by addition, in turn, of 0.00005 gram-mole of zinc bis(thenoyl trifluoroacetonate), 1 ml. (0.00005 gram-mole) of a 0.05 M benzene solution of vanadium tris(thenoyl trifluoroacetonate) and diisobutyl aluminum chloride (0.0015 gram-mole) to the monomer mixture of Part A. The reaction mixture was agitated thereafter for 30 minutes at 0° C. while monomer gases were continuously introduced at the previously described rates. Then the reaction was stopped by adding of 10 ml. of isopropyl alcohol to deactivate the catalyst. A copolymer solution was then poured into about 500 ml. of isopropyl alcohol, the coagulated copolymer was filtered off and washed with isopropanol in a blendor and finally air dried. The yield of ethylene/propylene/1,4-hexadiene copolymer was 18.6 g.

C. The procedures of parts A and B above were repeated except that zinc bis(hexafluoroacetylacetonate) was substituted for zinc bis(thenoyl trifluoroacetonate). The yield of copolymer obtained was 19.2 g.

D. The procedures of parts A and B above were repeated except that the zinc compound was omitted. The yield of ethylene/propylene/1,4-hexadiene copolymer was only 6.1 g. This comparative experiment, which is outside the scope of the present invention, was done to demonstrate the need for the zinc compound.

*Example 2*

A. The general procedure and apparatus described in Parts A and B of Example 1 above were employed except as noted hereafter. One liter of n-hexane at 0° C. was saturated by a monomer stream supplying ethylene and propylene at the respective rates of 2 and 4 liters per minute: 8 milliliters of 1,4-hexadiene were subsequently introduced. The coordination catalyst was formed in situ by introduction, in turn, of 0.0005 gram-mole of vanadium tris(thenoyl trifluoroacetonate), 0.0005 gram-mole of zinc bis(thenoyl trifluoroacetonate) and 0.0035 gram-mole of diisobutylaluminum chloride. After 30 minutes reaction time at 0° C., the catalyst was deactivated and the copolymer isolated as described in Example 1. Forty-one grams of copolymer were obtained having the following monomer composition (by weight): ethylene, 47.9%; propylene, 49%; 1,4-hexadiene, 3.1%.

B. Substitution of tetrachloroethylene: The procedure of Part A above was repeated except that tetrachloroethylene was substituted for n-hexane. There were obtained 46.2 g. of copolymer having the following monomer unit composition (by weight): ethylene, 48.9%; propylene, 48%; and 1,4-hexadiene, 3.1%.

C. Substitution of toluene: The procedure of Part A above was repeated except that toluene was substituted for n-hexane. The copolymer obtained weighed 48.9 g. and had the following monomer unit composition (by weight): ethylene, 46.4%; propylene, 51%; and 1,4-hexadiene, 2.6%.

*Example 3*

A. The general procedure and apparatus described in Parts A and B of Example 1 above were repeated except as noted hereafter. One liter of hexane at 25° C. was saturated by a monomer stream supplying ethylene and propylene at the respective rates of one liter per minute and 2.5 liters per minute. The coordination catalyst was formed in situ by introduction, in turn, of (1) a mixture containing 0.00025 gram-mole of vanadium tris(thenoyl trifluoroacetonate) and 0.00025 gram-mole of zinc bis(thenoyl trifluoroacetonate), and (2) 0.0025 gram-mole of diisobutyl aluminum chloride. After 30 minutes reaction time at 25° C., the catalyst was deactivated with alcohol; the copolymer solution was then washed with aqueous ammonia. Evaporation of the solvent gave 14 grams of ethylene/propylene copolymer analyzing for 61 wt. percent propylene monomer units.

B. Substitution of triisobutyl aluminum: A comparative experiment was run outside the scope of the present invention. The procedure of Part A was repeated except that: (1) triisobutyl aluminum (0.002 gram-mole) was substituted for the diisobutyl aluminum chloride; (2) the copolymer was precipitated from solution with ethanol. Only 2 grams of ethylene/propylene copolymer were obtained.

Example 4

The general procedure and apparatus described in Parts A and B of Example 1 above were repeated except as noted hereafter. The reactor was a 1.5-liter stainless steel pressure vessel equipped with an agitator and inlet and outlet tubes. One liter of cyclohexane at 40° C. was saturated at 110 p.s.i. (gauge) pressure by a monomer stream supplying 1.3 and 5.0 liters per minute, respectively, of ethylene and propylene. After 47 milliliters (0.007 gram-mole) of 1,4-hexadiene had been introduced, the coordination catalyst was formed, in situ, by addition, in turn, of (1) a mixture containing 0.0005 gram-mole of vanadium tris(thenoyl trifluoroacetonate) and 0.0005 gram-mole of zinc bis(thenoyl trifluoroacetonate), and (2) 0.007 gram-mole of diisobutyl aluminum chloride. Heat was evolved and the temperature rose to 52° C. After the mixture had been stirred at about 50° C. for 30 minutes at 110 p.s.i. (gauge) while the ethylene/propylene gas mixture was continually introduced at the above-described rates, the reaction was stopped by addition of 20 milliliters of isopropanol. The reaction mixture was mixed with ethanol to precipitate the copolymer; the rubbery product was filtered off, washed with additional ethanol, and dried. The ethylene/propylene/1,4-hexadiene copolymer weighed 17 grams, exhibited an inherent viscosity of 1.03 (0.1% by weight solution in tetrachloroethylene at 30° C.); and had the following monomer unit composition (by weight): ethylene, 59.5%; propylene, 36.5; 1,4-hexadiene, 4.0%.

Example 5

A. The apparatus and general procedure of Example 1 (Parts A and B) above were repeated except as noted hereafter. The hexane was saturated at 0° C. by introduction of a monomer gas stream supplying ethylene and propylene at respective rates of 0.8 liter/minute and 3.2 liters/minute. The coordination catalyst was formed in situ by successive introduction of 0.00025 gram-mole of zinc bis(thenoyl trifluoroacetonate), 0.00025 gram-mole of vanadium tris(thenoyl trifluoroacetonate) and 0.0015 gram-mole of diisobutylaluminum chloride. The ethylene/propylene/1,4-hexadiene copolymer isolated after 20 minutes reaction time weighed 21.2 grams.

B. The procedure of Part A above was repeated except that the zinc promoter compound described therein was replaced by 0.00025 gram-mole of the zinc chelate of dibenzoylmethane. The ethylene/propylene/1,4-hexadiene copolymer obtained weighed 17.4 grams.

C. The procedure of Part A above was repeated except that 0.000125 gram-mole of zinc salicylate chelate was substituted for the zinc chelate described therein. The ethylene/propylene/1,4-hexadiene copolymer obtained weighed 16.1 grams.

D. The procedure of Part A above was repeated except that the chelate compound consisted of 0.000125 gram-mole of cadmium bis(trifluoroacetylacetonate). The ethylene/propylene/1,4-hexadiene copolymer obtained weighed 17.1 grams.

E. A comparative experiment was carried out outside the scope of the present invention according to the procedure of Part A wherein the zinc bis(thenoyl trifluoroacetylacetonate) promoter was omitted. Only 10.6 grams of ethylene/propylene/1,4-hexadiene copolymer were obtained.

Example 6

The general procedure of Parts A and B of Example 1 above were repeated except as noted hereafter. The hexane solution was saturated by introduction of a feed stream supplying ethylene and propylene at respective rates of 1 and 2.5 liters per minute. Five milliliters of 1,4-hexadiene were then added. The coordination catalyst was formed in situ by successive addition of 0.00025 gram-mole of zinc bis(thenoyl trifluoroacetonate), 0.00025 gram-mole of vanadium tris(acetylacetonate), and 0.0015 gram-mole of diisobutylaluminum chloride. After the polymerization reaction had been carried out at 0° C. for 20 minutes while monomer gases were introduced continually into the agitated mixture at the above-described rates, the catalyst was deactivated, the copolymer was coagulated, and the coagulum was collected and dried according to the procedure of Example 1 Part B above. The ethylene/propylene/1,4-hexadiene copolymer obtained weighed 22.3 grams.

B. The procedure of Part A above was repeated except that the zinc chelate of dibenzoylmethane was substituted for the zinc bis(thenoyl trifluoroacetonate). The ethylene/propylene/1,4-hexadiene copolymer obtained weighed 28.4 grams.

C. A comparative experiment was run outside the scope of the present invention by omitting use of the zinc chelate compound in the procedure of Part A above. The ethylene/propylene/1,4-hexadiene copolymer obtained weighed only 13.8 grams.

Example 7

A. The general procedure described in Example 1 (Parts A and B) was repeated except as noted hereafter. The coordination catalyst was formed in situ by introduction, in turn, of 0.00005 gram-mole of zinc bis(thenoyl trifluoroacetonate), 0.00005 gram-mole of vanadium tris(hexafluoroacetylacetonate), and 0.0015 gram-mole of diisobutylaluminum chloride. The ethylene/propylene/1,4-hexadiene copolymer obtained weighed 11.4 grams.

B. A comparative experiment was run outside the scope of the present invention by omitting the use of the zinc compound in the procedure of Part A above. Only 2.9 grams of ethylene/propylene/1,4-hexadiene copolymer were obtained.

Example 8

A. The general procedures of Parts A and B of Example 1 above were repeated except as noted hereafter. The coordination catalyst was formed in situ by introduction in turn of 0.00025 gram-mole of zinc bis(thenoyl trifluoroacetonate), 0.00025 gram-mole of tributylorthovanadate, and 0.00033 gram-mole of diisobutylaluminum chloride. The ethylene-propylene-1,4-hexadiene copolymer obtained after 30 minutes reaction time weighed 12.2 grams.

B. A comparative experiment was carried out outside the scope of the present invention. The procedure of Part A above was repeated except that the zinc chelate compound was omitted. Only 3.2 grams of copolymer were obtained.

Example 9

A. The reaction flask was a 1-liter glass resin flask equipped with a mechanical stirrer, a thermometer, a gas inlet tube, a gas outlet tube, and a liquid inlet tube covered with a rubber serum cap. This apparatus was flame-dried and allowed to cool under a stream of purified nitrogen which was maintained during subsequent operations until ethylene was introduced.

A blend was prepared containing 75% by volume cyclohexane and 25% by volume benzene. A 328.5-milliliter portion of this blend and 171.5 milliliters of 1,4-hexadiene were introduced into the reaction flask and thereafter sparged with purified nitrogen while rapidly stirred. After external cooling had been applied and the temperature had been adjusted to 0° C., the nitrogen feed was stopped and ethylene was introduced at the rate of 3.2 liters per minute into the reaction vessel below the agitated liquid surface. Continued inflow of this monomer feed stream saturated the mixed solvent; excess ethylene was allowed to escape through the gas outlet tube which was attached to suitable traps to prevent inflow of air into the apparatus.

B. The coordination catalyst was formed in situ by addition, in turn, of 5 milliliters (0.00025 gram-mole) of a 0.05 M benzene solution of vanadium tris(acetylacetonate), 0.00004 gram-mole of zinc bis(thenoyl trifluoroacetonate), and 1.5 milliliters (0.0015 gram-mole) of a 1 M solution of diisobutyl aluminum chloride in benzene to the monomer mixture of Part A. The reaction mixture was agitated thereafter for 15 minutes at 0° C. while ethylene was continuously introduced at the previously-described rate. Then the reaction was stopped by addition of 10 milliliters of isopropyl alcohol to deactivate the catalyst. After the copolymer solution had been poured into about 500 milliliters of isopropyl alcohol, the coagulated copolymer was filtered off and washed with isopropanol in a Blendor, and air-dried. The yield of ethylene/1,4-hexadiene copolymer was 28.7 grams. This product displayed an inherent viscosity of 1.22 (measured at 30° C. on a 0.1% solution of the copolymer in tetrachloroethylene) and analyzed for 36% by weight 1,4-hexadiene monomer units.

C. Comparative experiment: An experiment was run outside the scope of the present invention for purposes of comparison. The procedure of (B) above was repeated except that the zinc bis(thenoyl trifluoroacetonate) was omitted. The yield of ethylene/1,4-hexadiene copolymer was only 15 grams. This product had an inherent viscosity of 1.58 and a 1,4-hexadiene monomer unit content of 34.3% by weight.

*Example 10*

A. The apparatus and the procedure described in Part A of Example 9 above were employed.

B. The coordination catalyst was formed in situ by addition, in turn, of 5 ml. (0.00025 gram-mole) of a 0.05 M benzene solution of vanadium tris(acetyl acetonate) and 1:5 ml. of a benzene solution 1 M in diisobutyl aluminum chloride and 0.01667 M in zinc bis (acetylacetonate) to the monomer mixture of Part A. The reaction mixture was agitated thereafter for 15 minutes at 0° C. while ethylene was continuously introduced at the previously-described rate. Then the reaction was stopped by addition of 10 ml. of isopropyl alcohol. Treatment of the solution by the procedure described in Example 9 above gave 26.6 grams of ethylene/1,4-hexadiene copolymer.

C. V:Zn ratio increased to 30:1: The procedure of Part B above was repeated except that the molar ratio of vanadium to zinc was increased from 10:1 to 30:1. After the vanadium tris(acetylacetonate) had been added to the monomer mixture, 0.5 milliliter of the solution of zinc bis(acetylacetonate) and diisobutyl aluminum chloride, and 1 ml. of a 1 M solution of diisobutyl aluminum chloride in benzene were added, in turn, to the reactor. The ethylene/1,4-hexadiene copolymer obtained weighed 28.2 grams.

D. V:Zn molar ratio 50:1: The procedure of Part C above was repeated except that the molar ratio of vanadium to zinc was increased from 30:1 to 50:1. The coordination catalyst was formed in situ by introduction, in turn, of 5 ml. of the vanadium tris(acetylacetonate) solution, 0.3 ml. of the solution of zinc bis(acetylacetonate) and diisobutyl aluminum chloride, and 1.2 ml. of the 1 M solution of diisobutyl aluminum chloride in benzene into the reactor. The ethylene/1,4-hexadiene copolymer obtained 29.1 grams.

E. Comparative experiment: When the zinc bis(acetylacetonate) was omitted from the above procedures, only 15 grams of ethylene/1,4-hexadiene copolymer were obtained.

*Example 11*

A. The apparatus and general procedure described in Part A of Example 9 were used except that the gas stream fed to the reactor at the rate of 3 liters per minute consisted of an equimolar mixture of ethylene and nitrogen.

B. The procedure of Part B of Example 10 above was repeated except that the reaction time was increased to 30 minutes, a mixture of ethylene (1.5 liters per minute) and nitrogen (1.5 liters per minute) was introduced, and the copolymer was isolated by evaporation of the solvent at room temperature. The yield was 7.8 grams.

C. Comparative experiments: An experiment was run outside the scope of the present invention for purposes of comparison. The procedures of Parts A and B above were repeated except that no zinc compound was employed. The yield of ethylene/1,4-hexadiene copolymer was only 3.9 grams.

*Example 12*

A. The procedures of Parts A and B of Example 10 above were repeated except that the concentration of diisobutyl aluminum chloride was cut in half. The ethylene/1,4-hexadiene copolymer obtained weighed 10.7 grams.

B. Comparative experiment: A comparative experiment outside the scope of the present invention was carried out by repeating the procedure of Part A above except that the zinc bis acetylacetonate) was omitted. The yield of ethylene/1,4-hexadiene copolymer was only 7.1 grams.

*Example 13*

A. The chelate, vanadium tris(hexafluoroacetylacetonate), was prepared by adding 30 grams (0.16 mole) of hexafluoroacetylacetone to a solution of 6.3 grams $VCl_3$ (0.04 mole) in about 150 ml. deaerated distilled water. A brown precipitate formed. The mixture was stored at room temperature for about 10 minutes before a solution of 10 grams (0.12 mole) of sodium bicarbonate in 150 ml. of water was added slowly with stirring, in a nitrogen atmosphere. About 29 grams of a crude brown solid product was obtained after filtration and drying in a vacuum desiccator. Before use, the product was obtained as shiny golden brown crystals upon recrystallization from benzene.

B. The reactor described in Example 9A was charged with 383 ml. of purified tetrachloroethylene and 117 ml. of purified 1,4-hexadiene. The reactor was sparged with $N_2$ as in Example 9A and presaturated with a stream of 3 liters/min. of ethylene and 1 liter/min. of $N_2$, while the reactor was at about 10° C. These gas flows were continued throughout the experiment.

The coordination catalyst was formed in situ by the addition, in turn, 0.25 millimole of vanadium tris(hexafluoroacetylacetonate), 0.025 millimole of zinc acetylacetonate and 1.5 millimoles of diisobutylaluminum chloride to the monomer-solvent mixture. After the commencement of the reaction, 25-ml. aliquots of the solution were withdrawn after five minute intervals, the catalyst deactivated by the addition of a few ml. of isopropyl alcohol, and the polymer isolated by evaporation of solvents, and weighed. Results were as follows.

| Sample: After— | Polymer (g./aliquot) |
|---|---|
| 5 min. | 0.323 |
| 10 min. | 0.527 |
| 15 min. | 0.613 |
| 20 min. | 0.668 |

When the example was repeated for comparison without the zinc component, the results were

| Sample: After— | Polymer (g./aliquot) |
|---|---|
| 5 min. | 0.057 |
| 10 min. | 0.176 |
| 15 min. | 0.298 |
| 20 min. | 0.400 |

Example 14

A. The chelate, vanadium tris(trifluoroacetyl acetonate), was prepared in the same manner as indicated in Example 13A using equivalent amounts of trifluoroacetyl acetone ($CF_3COCH_2COCH_3$) in place of hexafluoroacetyl acetone ($CF_3COCH_2COCF_3$).

B. The polymerization of ethylene and 1,4-hexadiene set forth in Example 13, part B, was repeated using equivalent amounts of vanadium tris(trifluoroacetyl acetonate) as the vanadium component. Removal of 25-ml. aliquots at five minute intervals revealed the following.

| Sample: After— | Polymer (g./aliquot) |
|---|---|
| 5 min. | 0.46 |
| 10 min. | 0.54 |

When the zinc component was omitted for comparison the results were as follows.

| Sample: After— | Polymer (g./aliquot) |
|---|---|
| 5 min. | 0.286 |
| 10 min. | 0.451 |

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. A catalyst composition in an inert solvent of (1) about 3 to 30 molar portions of a dialkylaluminum monohalide wherein said halide is selected from the group consisting of chlorine, bromine, and iodine; (2) about one molar portion of a vanadium compound selected from the group consisting of trialkylorthovanadates, triphenylorthovanadates having hydrogen attached to the ortho-position, and open-chain beta-diketone chelates of trivalent vanadium having no more than 30 carbon atoms and having the formula

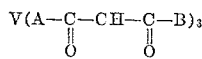

wherein A and B are selected from the group of radicals consisting of alkyl, cycloalkyl, aryl, aralkyl, 2-thienyl, 2-furyl, and haloalkyl; and (3) at least about a 0.01 molar portion of a metal promoter selected from the group consisting of open-chain beta-diketone chelates having no more than 30 carbon atoms and having the formula $$M(A-C-CH-C-B)_2$$
$$\quad\; \|\quad\quad\; \|$$
$$\quad\; O\quad\quad O$$

wherein M is selected from the group consisting of zinc and cadmium and A and B are as defined above, zinc salicylate, and cadmium salicylate; with the proviso that the vanadium concentration in said solvent be at least 0.0001 molar.

2. A catalyst composition in an inert solvent of (1) about 6 to 14 molar portions of a dialkylaluminum monohalide wherein said halide is selected from the group consisting of chlorine, bromine, and iodine; (2) about one molar portion of a vanadium compound selected from the group consisting of trialkylorthovanadates, triphenylorthovanadates having hydrogen attached to the ortho-position, and open-chain beta-diketone chelates of trivalent vanadium having no more than 30 carbon atoms and having the formula

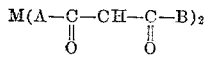

wherein A and B are selected from the group of radicals consisting of alkyl, cycloalkyl, aryl, aralkyl, 2-thienyl, 2-furyl, and haloalkyl; and (3) about 0.01 to 5 molar portions of a metal promoter selected from the group consisting of open-chain beta-diketone chelates having no more than 30 carbon atoms and having the formula

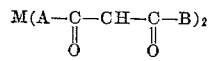

wherein M is selected from the group consisting of zinc and cadmium and A and B are as defined above, zinc salicylate, and cadmium salicylate; with the proviso that the vanadium concentration be at least 0.0001 molar.

3. A catalyst composition as described in claim 1 wherein said dialkylaluminum halide is diisobutyl aluminum chloride.

4. A catalyst composition as described in claim 1 wherein said vanadium compound is vanadium tris(thenoyl trifluoroacetonate).

5. A catalyst composition as described in claim 1 wherein said vanadium compound is vanadium tris(acetylacetonate).

6. A catalyst composition as described in claim 1 wherein said vanadium compuond is vanadium tris(trifluoroacetyl acetonate).

7. A catalyst composition as described in claim 1 wherein said vanadium compound is vanadium tris(hexafluoroacetyl acetonate).

8. A catalyst composition as described in claim 1 wherein said metal promoter is zinc bis(thenoyl trifluoroacetonate).

9. A catalyst composition as described in claim 1 wherein said metal promoter is zinc bis(acetylacetonate).

10. A catalyst composition in an inert solvent of (1) about 3 to 14 molar portions of diisobutyl aluminum chloride; (2) about one molar portion of vanadium tris (thenoyl trifluoroacetonate); and about 0.01 to 5 molar portions of zinc bis(thenoyl trifluoroacetonate); with the proviso that the vanadium concentration in said solvent be at least 0.0001 molar.

11. A catalyst composition in an inert solvent of (1) about 3 to 14 molar portions of dipropyl aluminum chloride; (2) about one molar portion of tributyl orthovanadate; and about 0.2 to 5 molar portions of zinc salicylate; with the proviso that the vanadium concentration in said solvent be at least 0.0001 molar.

12. In a process for preparing polymers of at least one alpha-monoolefin of the formula $R-CH=CH_2$ wherein R is selected from the group consisting of hydrogen and alkyl of no more than 16 carbon atoms in an inert solvent at a temperature of about $-30°$ C. to $+70°$ C. the improvement which comprises employing a catalyst composition of (1) about 3 to 30 molar portions of a dialkylaluminum monohalide wherein said halide is selected from the group consisting of chlorine, bromine, and iodine; (2) about one molar portion of a vanadium compound selected from the group consisting of trialkyl orthovanadates, triphenyl orthovanadates having hydrogen attached to the ortho-position, and open-chain beta-diketone chelates of trivalent vanadium having no more than 30 carbon atoms and having the formula

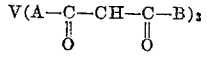

wherein A and B are selected from the group of radicals consisting of alkyl, cycloalkyl, aryl, aralkyl, 2-thienyl, 2-furyl, and haloalkyl; and (3) at least about a 0.01 molar portion of a metal promoter selected from the group consisting of open-chain beta-diketone chelates having no more than 30 carbon atoms and having the formula

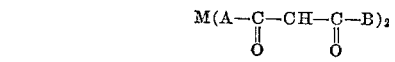

wherein M is selected from the group consisting of zinc and cadmium and A and B are as defined above, zinc salicylate, and cadmium salicylate; with the proviso that the vanadium concentration be at least 0.0001 molar.

13. A process as defined in claim 12 wherein said catalyst composition comprises (1) diisobutyl aluminum chloride, (2) vanadium tris(thenoyl trifluoroacetonate), and (3) zinc bis(thenoyl trifluoroacetate).

14. A process as defined in claim 12 wherein said catalyst composition comprises (1) dipropyl aluminum chloride, (2) tributyl orthovanadate, and (3) zinc salicylate.

15. A process as defined in claim 12 wherein said catalyst composition comprises (1) dibutyl aluminum chloride, (2) vanadium tris(acetylacetonate), and (3) zinc bis(acetylacetonate).

16. In a process for preparing a polymer in an inert solvent of at least one alpha-monoolefin of the formula R—CH=CH$_2$ where R is selected from the group consisting of hydrogen and alkyl of no more than 16 carbon atoms and at least one non-conjugated diene at a temperature of about —30° C. to +70° C. the improvement which comprises employing a catalyst composition comprising (1) about 3 to 30 molar portions of a dialkyl aluminum monohalide wherein said halide is selected from the group consisting of chloride, bromine, and iodine; (2) about one molar portion of a vanadium compound selected from the group consisting of trialkyl orthovanadates, triphenyl orthovanadates having hydrogen attached to the ortho-position, and open-chain beta-diketone chelates of trivalent vanadium having no more than 30 carbon atoms and having the formula

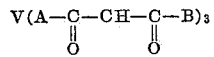

wherein A and B are selected from the group of radicals consisting of alkyl, cycloalkyl, aryl, aralkyl, 2-thienyl, 2-furyl, and haloalkyl; and (3) at least about a 0.01 molar portion of a metal promoter selected from the group consisting of open-chain beta-diketone chelates having no more than 30 carbon atoms and having the formula

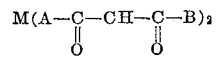

wherein M is selected from the group consisting of zinc and cadmium and A and B are as defined above, zinc salicylate, and cadmium salicylate; with the proviso that the vanadium concentration be at least 0.0001 molar.

17. In a process for preparing an ethylene/propylene copolymer in an inert solvent at a temperature of about —30° C. to +70° C. the improvement which comprises employing a catalyst composition of (1) about 3 to 30 molar portions diisobutyl aluminum chloride, (2) about one molar portion of vanadium tris(thenoyl trifluoroacetate), and (3) at least about 0.01 molar portion of zinc bis(thenoyl trifluoroacetate); with the proviso that the vanadium concentration be at least 0.0001 molar.

18. In a process for preparing an ethylene/propylene/1,4-hexadiene copolymer in an inert solvent at a temperature of about —30° C. to +70° C. the improvement which comprises employing a catalyst composition of (1) about 3 to 30 molar portions of diisobutyl aluminum chloride, (2) about one molar portion of vanadium tris(thenoyl trifluoroacetate), and (3) at least about 0.01 molar portion of zinc bis(thenoyl trifluoroacetate); with the proviso that the vanadium concentration be at least 0.0001 molar.

19. In a process for preparing an ethylene/1,4-hexadiene copolymer in an inert solvent at a temperature of about —30° C. to +70° C. the improvement which comprises employing a catalyst composition of (1) about 3 to 30 molar portions of diisobutyl aluminum chloride, (2) about one molar portion of vanadium tris(acetylacetonate), and (3) at least 0.01 molar portion of zinc bis(acetylacetonate); with the proviso that the vanadium concentration be at least 0.001 molar.

No references cited.

JOSEPH L. SCHOFER, *Primary Examiner.*